United States Patent
Weber

(10) Patent No.: US 10,011,214 B2
(45) Date of Patent: Jul. 3, 2018

(54) VEHICLE HEADLIGHT

(71) Applicant: ZKW GROUP GMBH, Wieselburg (AT)

(72) Inventor: Emanuel Weber, Baden (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days.

(21) Appl. No.: 15/829,571

(22) Filed: Dec. 1, 2017

(65) Prior Publication Data

US 2018/0126898 A1 May 10, 2018

Related U.S. Application Data

(63) Continuation-in-part of application No. PCT/AT2016/050169, filed on May 31, 2016.

(30) Foreign Application Priority Data

Jun. 1, 2015 (AT) .............................. A 50444/2015

(51) Int. Cl.
*B60Q 1/26* (2006.01)
*F21S 41/16* (2018.01)
(Continued)

(52) U.S. Cl.
CPC ................ *B60Q 1/26* (2013.01); *F21S 41/16* (2018.01); *H01S 3/1305* (2013.01);
(Continued)

(58) Field of Classification Search
CPC .. H05B 33/08; H05B 33/0809; H05B 33/083; H05B 33/0812; H05B 33/0815;
(Continued)

(56) References Cited

U.S. PATENT DOCUMENTS 8,917,026 B2 * 12/2014 Ferrier ................. H05B 33/083
315/119
9,423,091 B2 8/2016 Reinprecht et al.
(Continued)

FOREIGN PATENT DOCUMENTS

AT 513479 A1 4/2014
EP 2670218 A1 12/2013
(Continued)

OTHER PUBLICATIONS

International Search Report for PCT/AT2016/050169, dated Jul. 19, 2016 (2 pages).
(Continued)

*Primary Examiner* — Haissa Philogene
(74) *Attorney, Agent, or Firm* — Eversheds Sutherland (US) LLP

(57) ABSTRACT

A vehicle headlight with a laser light source (1), having at least on laser diode branch (Z) with at least one modulated laser diode ($D_L$), wherein the laser beam (2) of the at least one laser diode can be directed in a scanning manner by means of a light scanner (7) onto a light conversion means (8) in order to generate a luminous image (11) on same, which is projected by means of an imaging system (12) as light image (11') onto the road (13), as well as with a laser diode controller (3) and a processing unit (4) associated with same, which is supplied with sensor signals (s1 . . . sn) and which delivers a modulation signal ($s_m$) for the laser diode controller, and with a controlled power supply (15) for the laser diode controller. The laser diode branch (Z) is bridged by a controlled parallel circuit (P) which is designed as a current controller with an analog controller (16, T2) of the laser diode controller (3) and the modulation signal ($s_m$) is fed to the analog controller.

7 Claims, 3 Drawing Sheets

(51) Int. Cl.
*H01S 3/13* (2006.01)
*G02B 27/30* (2006.01)
*H01S 3/00* (2006.01)
*F21Y 115/30* (2016.01)

(52) U.S. Cl.
CPC ....... *B60Q 2400/50* (2013.01); *F21Y 2115/30* (2016.08); *G02B 27/30* (2013.01); *H01S 3/0071* (2013.01)

(58) Field of Classification Search
CPC .... H05B 33/0887; F21S 41/14; F21S 41/141; F21S 41/663; F21S 41/285; B60Q 1/06; B60Q 2300/054; F21Y 2115/30; G01S 17/89

See application file for complete search history.

(56) References Cited

U.S. PATENT DOCUMENTS 9,777,901 B2 10/2017 Reinprecht et al.
2013/0207559 A1 8/2013 Ferrier
2016/0152173 A1 6/2016 Mayer
2017/0321857 A1* 11/2017 Reisinger ............. F21S 48/1145
2017/0328532 A1* 11/2017 Edlinger ................ F21S 41/135
2018/0022266 A1* 1/2018 Tzeng .................... B60Q 1/143
2018/0045392 A1* 2/2018 Winterer ............. F21S 48/1145

FOREIGN PATENT DOCUMENTS

EP       2797386 A1    10/2014
WO    2014/087874 A1    6/2014

OTHER PUBLICATIONS

Search Report issued in Austrian Application No. A 50444/2015, completed Apr. 27, 2016 (1 page).

* cited by examiner

VEHICLE HEADLIGHT

CROSS-REFERENCE TO RELATED APPLICATIONS

This application is a continuation-in-part of PCT/AT2016/050169, filed May 31, 2016, which claims priority to Austrian Patent Application No. A 50444/2015, filed Jun. 1, 2015, both of which are incorporated by reference herein.

FIELD

The invention relates to a vehicle headlight with a laser light source, having at least on laser diode branch with at least one modulated laser diode, wherein the laser beam of the at least one laser diode can be directed in a scanning manner by means of a light scanner onto a light conversion means in order to generate a luminous image on same, which is projected as a light image onto the road via an imaging system, as well as with a laser diode controller and a processing unit associated with same, which is supplied with sensor signals, and which delivers a modulation signal for the laser diode controller, and with a controlled power supply for the laser diode controller.

BACKGROUND

The emergence of light systems based on laser diodes in the area of motor vehicles requires increasingly higher modulation speeds of the diode current, wherein for this modulation, a high-frequency closed-loop or open-loop control must be provided. Conventional DC/DC converters used for LED control are no longer usable at modulation frequencies in the MHz range, and so for applications at such high switching frequencies, a particularly fast closed-loop or open-loop current control must be provided. A possible design is an upstream "slow" DC/DC converter (e.g. boost) with a subsequent analog linear stage. However, such a downstream linear stage results in irregular stress on the DC/DC converter and to a permanent power loss.

Document EP 2 670 218 A1 describes a control for LEDs of a headlight; however, it is not a scanning system of the type in question, in which a modulated laser beam is directed by means of a light scanner to a light conversion means in order to create a luminous image on same which is projected as light image onto the road.

Document AT 513 916 A2 shows a headlight on the basis of a modulated laser light source with a scanning laser beam for generating a luminous image on a light conversion means, wherein the control of a plurality of lasers is only described in general without elaborating on circuit details.

For a vehicle headlight according to the preamble of the independent claim, the current in the light source branch must be adjusted due to the continuous adjustment to the required light image, wherein operation takes place mainly in the range of the maximum current, which results in considerable losses.

A problem addressed by the invention is that of creating a headlight which uses a laser beam generated, modulated and scanning by laser diodes, and in which no high losses occur which not only result in an increased thermal stress but also in high costs due to the required dimensioning. Particularly the voltage supply of the laser diode(s), for example, a DC/DC converter, is supposed to be stressed as evenly as possible, regardless of the modulation processes.

SUMMARY

The problem addressed is solved with a headlight of the initially described type, in which, according to the invention, the laser diode branch is bridged by a controlled parallel circuit which is designed as a current controller with an analog controller of the laser diode controller, and the modulation signal is fed to the analog controller.

Owing to the invention, the stress is more even, particularly on the passive components, and a more stable operating point adjustment is ensured. Costs and installation space can also be saved due to a smaller dimensioning of the output capacitor of the power supply. Contrary to known solutions, see e.g., AT 513 479 A1 by the applicant, in which the switching or modulating in the laser diode branch is effected by a series switch, in which a relatively high power loss occurs, the power loss can also be reduced by the parallel circuit.

A simple and cost-efficient and thus advantageous design of the invention is characterized in that the analog controller comprises an operational amplifier and a transistor controlled by said operational amplifier.

In a practice-oriented and economical variation, a signal, which is proportional to the current through the laser diode branch, is fed as control variable to the analog controller.

The realization of a traffic-related masking scenario can be facilitated if a resistor, through which the branched-off current flows, is arranged in the parallel circuit.

It is further expedient if the power supply is a DC/DC converter.

In such case, it is advantageous if the power supply is set for maximum load current.

In many cases, it is expedient if the power supply is a boost converter.

BRIEF DESCRIPTION OF DRAWINGS

In the following, the invention, including further advantages, is described in more detail using exemplary embodiments which are shown in the drawing. In said drawing.

DETAILED DESCRIPTION

Figure 1:
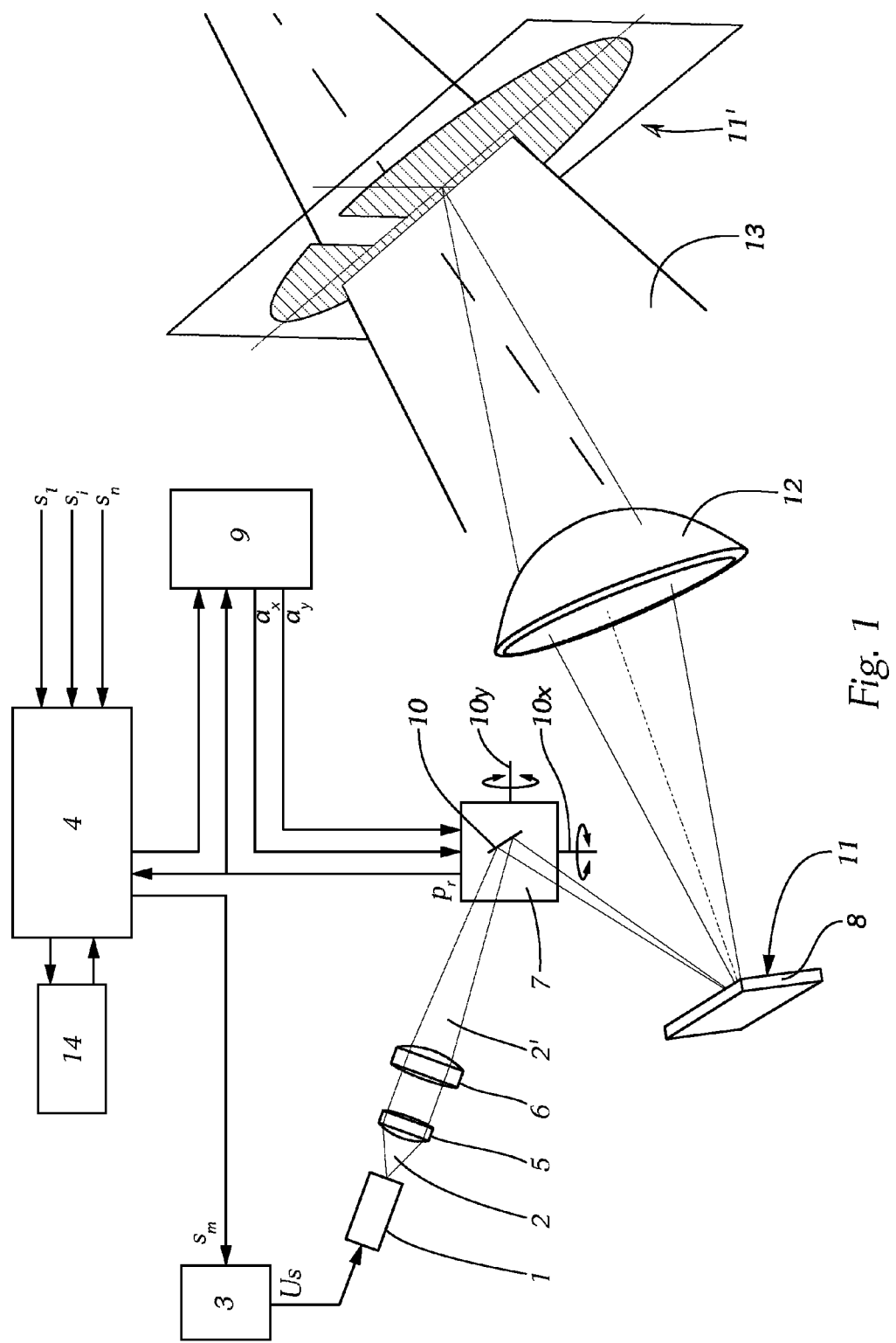
FIG. 1 shows the fundamental structure of a headlight which utilizes a scanning, modulated laser beam.

FIG. 1 shows the important parts for a headlight according to the invention, wherein it is obvious that a motor vehicle headlight contains many more parts which allow for its meaningful use in a motor vehicle, particularly a passenger car or a motorcycle. The lighting-related starting point of the headlight is a laser light source 1, which emits a laser beam 2 and has an associated laser controller 3, wherein said controller 3 is used as power supply as well as for monitoring of the laser emission or, e.g. as temperature control, and which is also designed for modulating the intensity of the emitted laser beam. "Modulating" in the context of the present invention means that the intensity of the laser light source can be changed either continuously or pulsed in the sense of an activation and deactivation. It is essential that the light power can be changed analogously dynamically, depending on the angular position of a mirror to be described in detail below. In addition, there is also the option of activation and deactivation for a specific period of time in order to not illuminate or to mask defined points. An example of a dynamic control concept for generating an image by means of a scanning laser beam is described, for example, in document A 514633 by the applicant.

In practice, the laser light source frequently contains a plurality of laser diodes, for example, six of e.g. 1 watt each, in order to achieve the desired power or the required light flux.

The control signal of the laser light source 1 is denoted with $U_S$.

In turn, the laser controller 3 receives signals from a central processing unit 4, to which sensor signals $s_1 \ldots s_i \ldots s_n$ can be fed. These signals, for which a modulation signal $s_M$ is representatively shown in FIG. 1, can, e.g. be switching commands for switching from high beam to low beam, or signals which are recorded by sensors $S_1 \ldots S_n$, such as cameras, which detect the lighting condition, environmental conditions and/or objects on the road. The signals can also originate from vehicle-to-vehicle communication information. The processing unit 4, shown herein schematically as a block, can be contained entirely or to some extent in the headlight and is particularly also used to execute the method of the invention described below.

For example, the laser light source 1 emits blue or UV light, wherein collimating optics 5 and focusing optics 6 are arranged downstream from the laser light source. The design of the optics depends, among others, on the type, number and spatial placement of the laser diodes used, on the required beam quality and the desired laser spot size at the light conversion means.

The focused or formed laser beam 2' reaches a light scanner 7 and is reflected from a micromirror 10 to a light conversion means 8, which in the present example is designed as a luminous surface, said light conversion means 8 comprising, e.g. a phosphorus for light conversion in a known manner. For example, the phosphorus converts blue or UV light into "white" light. In the context of the present invention, "phosphorus" generally refers to a substance or substance mixture that converts light of one wavelength into light of another wavelength or a wavelength mixture, particularly into "white" light, which can be subsumed under the term "wavelength conversion."

Luminescent dyes are used, wherein the output wavelength is generally shorter and thus energy-richer than the emitted wavelength mixture. The desired white light impression is created through additive color mixing. In this context, "white light" refers to a spectral composition which in humans evokes the color impression "white." Naturally, the term "light" is not limited to the radiation visible to the human eye.

It must be noted at this point that the light conversion means in the drawing is shown as phosphorus surface, on which the scanning laser beam or scanning laser beams generate an image which is projected proceeding from this side of the phosphorus. However, it is also possible to use a translucent phosphorus, on which the laser beam, coming from the side facing away from the projection lens, generates an image, but wherein the radiating side is located on the side of the light conversion means facing the projection lens. Therefore, both reflecting and transmissive beam paths are possible, wherein a mixture of reflecting and transmissive beam paths can also not be ruled out.

In the present example, the micromirror 10 oscillates around two axes, is controlled by a mirror controller 9 by means of driver signals $a_x$, $a_y$ and, e.g. deflected in two directions x, y which are orthogonal to one another. The mirror controller 9 is also controlled by the processing unit 4 in order to be able to adjust the oscillation amplitude of the micromirror 10 as well as its current angular speed, wherein asymmetrical oscillations around the corresponding axis can also be adjusted. The control of micromirrors is known and can be effected by many different methods, e.g. electrostatically, electromagnetically, or electrodynamically. Expediently, the position of the micromirror 10 is fed back by means of a position signal $p_r$ to the mirror controller 9 and/or to the processing unit 4. It must be noted that other beam deflection means, such as movable prisms, can be used, even though the use of a micromirror is preferred.

The laser beam 2' thus scans over the light conversion means 8, which is generally planar, but not necessarily so, and generates a luminous image 11 with a predetermined light distribution. This luminous image 11 is subsequently projected as light image 11' onto the road 13 by means of an imaging system 12. The laser light source is pulsed with high frequency or continuously controlled, and so, depending on the position of the micromirror, any type of light distribution can not only be adjusted—for example, high beam/low beam—but also quickly changed if required due to a specific terrain or road situation, for example, if pedestrians or oncoming vehicles are detected by one or more of the sensors $S_1 \ldots S_n$ and a corresponding change of the geometry and/or intensity of the light image 11' of the road illumination is desired. In the present case, the imaging system 12 is shown simplified as a lens.

The term "road" herein is used for reasons of simplification because it naturally depends on the local conditions of whether the light image 11' is in fact located on the road or also extends beyond it. In principle, the image 11' corresponds to a projection onto a vertical surface according to the relevant standards which relate to the motor vehicle lighting technology.

Figure 2:
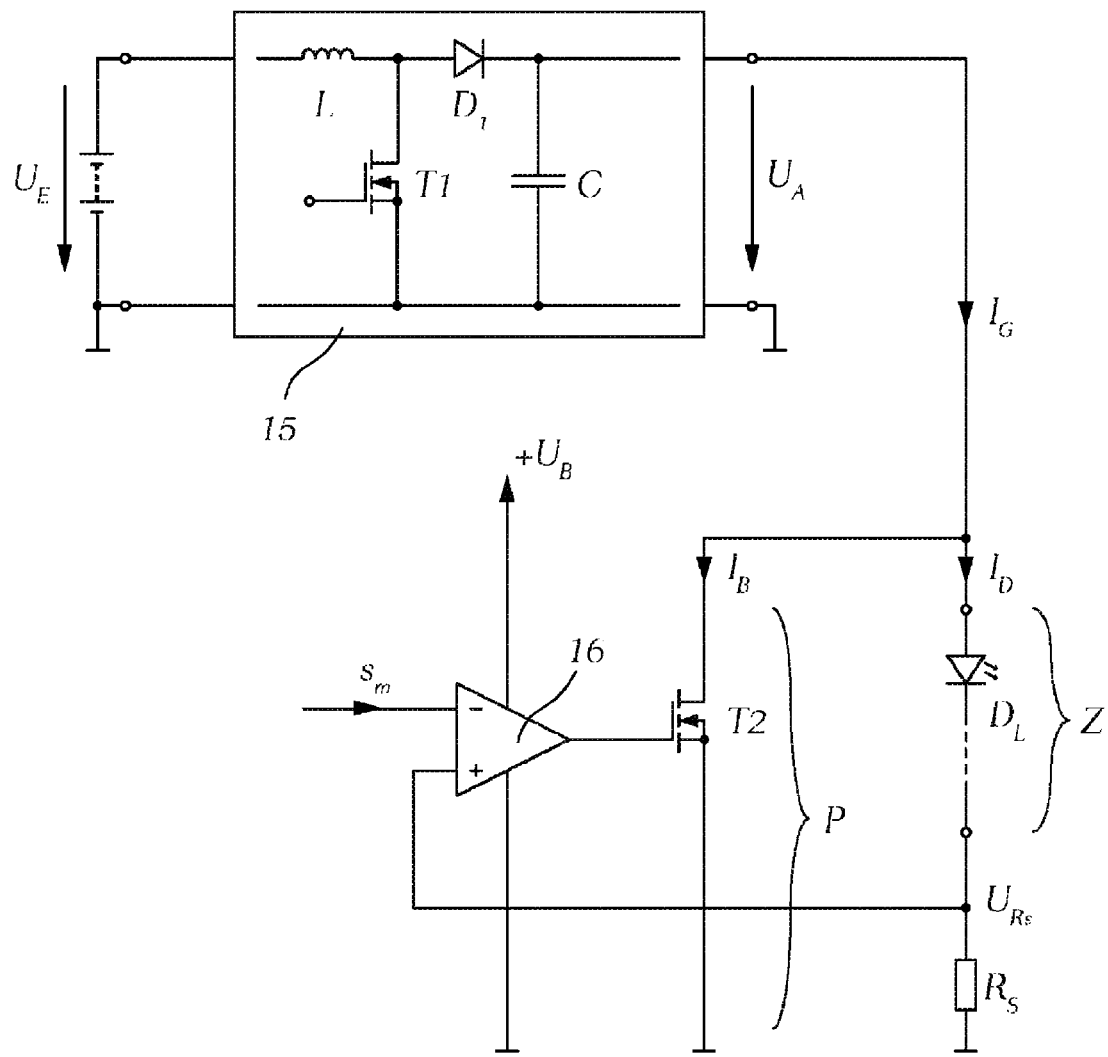
FIG. 2 shows an exemplary circuit arrangement for controlling a modulated laser in a headlight according to the invention.

The circuit arrangement for a lighting device or a headlight according to the invention as shown in FIG. 2 essentially describes the structure of the laser controller 3 in FIG. 1 and shows a voltage source $U_E$ which, e.g. is the accumulator of a motor vehicle, wherein in the present case, a boost converter 15 is arranged downstream of this voltage source $U_E$, with said boost converter only schematically showing a throttle L, a switching transistor T1, a rectifier diode D1, and a capacitor C.

This boost converter provides an output voltage $U_A$, which, by means of a sensor resistor $R_S$, supplies one branch Z with at least one laser diode $D_L$. It should be obvious that neither the presence of a boost converter (or buck converter) is required and that the laser diode branch Z contains laser diodes, the number of which is adjusted to the supply current, and in the simplest case contains one single laser diode.

According to the invention, an open-loop or closed-loop controlled parallel circuit is arranged parallel to the laser diode branch Z, said parallel circuit being designed as an analog, preferably linear current controller and in the present case having a transistor T2, e.g. an FET, lying parallel to the branch Z. A variable resistor $R_S$ lies in series with the laser diode branch Z. A part of the entire current $I_G$, supplied by the power supply, in this case the boost converter 15, flows through the laser diode branch Z as current $I_D$, and another part via the parallel branch as current $I_B$, in this case via the transistor T2. The transistor T2 is controlled by an operational amplifier 16 with the following variables being fed to said operational amplifier 16: As control variable $U_{RS}$, a voltage $U_{RS}$ proportional to the current $I_D$ in the laser diode branch Z and occurring at the resistor $R_S$, and the modulation signal 5M.

The power supply 15, in this case the boost converter, adjusts to the maximum current, wherein at full-load operation, i.e. at maximum current, essentially no power loss occurs at the analog controller, namely at T2. In case of a high-frequency modulating of the current of the laser diode(s) $D_L$, a current $I_B$ is branched off via the transistor T2 by means of the parallel circuit of the analog controller, and so the output current $I_G$ of the power supply remains constant, and an even load of the power supply 15, in this case the boost converter, is ensured.

Modulating refers to any influencing of the current by the laser diode $D_L$ (or laser diodes), including a so-called "dimming," which is required to provide the necessary optical performance at the appropriate points in the light image, or to be able to realize, e.g. a traffic-related masking scenario which, with regard to the speed of the modulation, is significantly more critical.

An already mentioned problem stems from the desire for a most even load of the power supply, regardless of the power demand of each of the laser diode(s) which corresponds to the modulation signal. According to the prior art, a capacitor C is thus frequently used at the output of a converter with high capacity which results in corresponding expenditure in installation space and costs.

The invention solves said problem by connecting the analog controller 16, T2 in parallel, with said analog controller 16, T2 absorbing a branched off current $I_D$ of the overall current $I_G$, i.e. "analogously," when compared to known solutions with electronic switches in the parallel branch, which determine the brightness of the laser diode by means of a PWM. During maximum power operation, there is no flow of the branched off current $I_B$, and so no power loss occurs in the parallel branch. This would very much be the case if the linear stage or the analog controller were to lie in series with the laser diode branch Z.

Once a modulation (dimming) of the laser diode(s) $D_L$ in the sense of a reduction of the current through the laser diode(s) is required due to a desired light output in the luminous image or light image 11', or because of a masking scenario, the modulation signal 5M, which can also be called reference signal for the operational amplifier 16, is changed accordingly. The differential voltage occurring at the input of the operational amplifier 16 results in a control of the transistor T2 in the sense of an increase of the current $I_B$, which further leads to a reduction of the current $I_D$ through the laser diode(s). Since the reduction of the diode current causes a decrease of the voltage $U_{RD}$ at the resistor $R_S$, which is fed to the second input of the operational amplifier 16, the differential voltage at the input of the operational amplifier moves toward zero in the sense of the desired closed-loop control.

Figure 3:
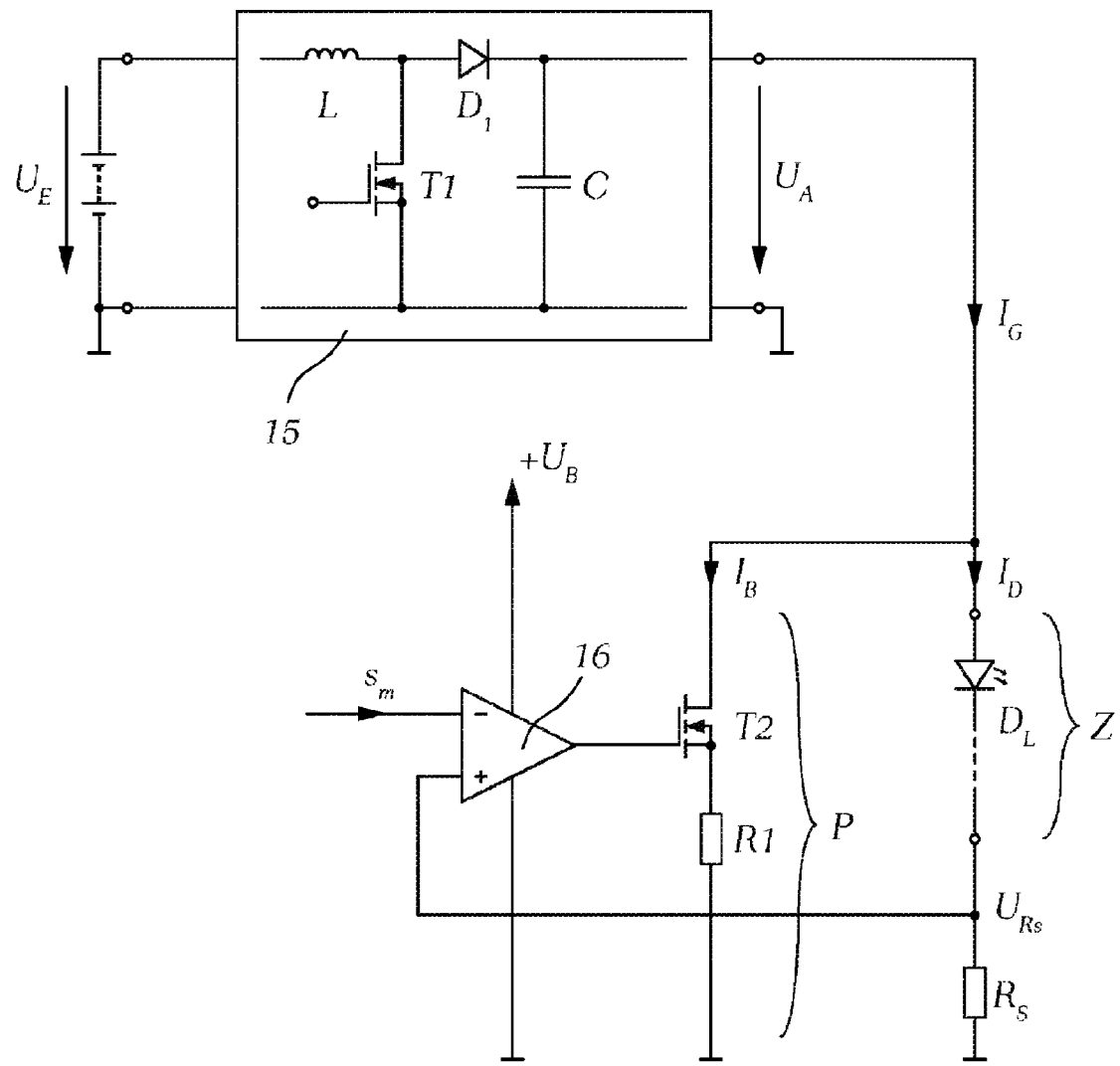
FIG. 3 shows a further embodiment of a circuit arrangement for controlling a modulated laser in a headlight according to the invention.

FIG. 3 shows a further advantageous embodiment, which contains particular advantages if traffic-related masking scenarios play a role. For such masking scenarios, an illumination intensity of less than 1 lx in the area to be masked is required, and in a preferred manner, the laser light source should be completely deactivated if a light scanner is used in the area to be masked, or the emission of the laser light source should at least be reduced such that there is no excitation of the light conversion means and the corresponding area in the light image thus appears completely darkened.

However, such case presents the problem that a complete "deactivation" of the laser light source would represent a complete bridging of the laser light source, which essentially corresponds to a shorting. In order to prevent such a load for the circuitry and to ensure protection in case of an error in the parallel circuit, a resistor R1, through which the branched-off current $I_B$ flows, can advantageously be arranged in said parallel circuit which, in case of a shorting or a complete "deactivation" of the laser light source 1, holds the output voltage of the boost converter 15 at a value defined by said resistor R1.

The value of the resistor R1 is preferably selected such that in case of a closed transistor T2, the current $I_D$ is reduced to a value which no longer suffices to excite the light conversion means 8 with the light output emitted from the laser light source 1, resulting in a purposeful masking in the light image 11'.

In particular, the resistance value of R1 is selected such that the laser supply voltage in case of a closed transistor T2 falls below a threshold voltage typical for a laser diode, thus ensuring a masking. In case of the series connection of a plurality of laser diodes, this voltage is naturally multiplied accordingly.

Components, which influence the frequency response and are well known to a person skilled in the art and are used in accordance with requirement, are omitted in the schematic depictions of FIGS. 1 and 2.

What is claimed is:

1. A vehicle headlight comprising:
   a laser light source (1) having at least one laser diode branch (Z) with at least one modulated laser diode ($D_L$);
   a light scanner (7);
   a light conversion means (8), wherein the laser beam (2) of the at least one laser diode can be directed in a scanning manner by means of the light scanner onto the light conversion means (8) in order to generate a luminous image (11) thereon;
   an imaging system (12) by means of which the luminous image is configured to be projected as light image (11') onto a road (13);
   a laser diode controller (3);
   a processing unit (4) associated with the laser diode controller, the processing unit being configured to receive sensor signals (s1 . . . sn) and to deliver a modulation signal ($s_m$) to the laser diode controller; and
   a controlled power supply (15) for the laser diode controller,
   wherein control of the laser light source is configured to be changed due to feedback of sensors (S1 . . . Sn), and
   wherein the at least one laser diode branch (Z) is bridged by a controlled parallel circuit (P) which is designed as a current controller with an analog controller (16, T2) of the laser diode controller (3) and wherein the modulation signal ($s_m$) is configured to be fed to the analog controller.

2. The vehicle headlight of claim 1, wherein the analog controller (16, T2) comprises an operational amplifier (16) and a transistor (T2) controlled by same.

3. The vehicle headlight of claim 1, wherein a signal, which is proportional to a current ($I_D$) through the laser diode branch (Z), is configured to be fed as control variable to the analog controller (16, T2).

4. The vehicle headlight of claim 1, wherein a resistor (R1), through which a branched-off current ($I_B$) is configured to flow, is arranged in the parallel circuit (P).

5. The vehicle headlight of claim 1, wherein the power supply is a DC/DC converter (15).

6. The vehicle headlight of claim 5, wherein the power supply is set for maximum load current.

7. The vehicle headlight of claim 6, wherein the power supply is a boost converter.

* * * * *